Aug. 2, 1966 F. KULCSAR 3,264,217

FERROELECTRIC CERAMIC COMPOSITIONS

Filed Sept. 21, 1962

INVENTOR.
FRANK KULCSAR

BY [signature]

ATTORNEY

United States Patent Office 3,264,217
Patented August 2, 1966

3,264,217
FERROELECTRIC CERAMIC COMPOSITIONS

Frank Kulcsar, Cleveland, Ohio, assignor to Clevite Corporation, a corporation of Ohio Filed Sept. 21, 1962, Ser. No. 225,201
20 Claims. (Cl. 252—62.9)

This invention relates broadly to compositions of matter and articles of manufacture fabricated therefrom. More particularly, the invention pertains to novel ferroelectric ceramics susceptible of electrostatic polarization and exhibiting, when polarized, electromechanical transducing properties similar to the well-known piezoelectric effect. As a result of these properties, materials of the type to which the present invention pertains have come to be known and may hereinafter be referred to as "piezoelectric ceramics."

While the principal product contemplated by the invention is the matured and polarized ceramic, as well as articles fabricated therefrom, it is to be understood that it also encompasses as intermediates the unreacted physical mixture of raw materials and the heat reaction product of such mixtures. Accordingly, the term "ceramic compositions" will be used herein to encompass and designate generically the compositions of matter at all stages from the unreacted physical mixtures to the matured and polarized ceramic which is the ultimate product.

Since the discovery of the first pizeoelectric ceramic, i.e., polarized barium titanate, by Gray (disclosed and claimed in U.S. Letters Patent No. 2,486,560), a considerable amount of effort has been devoted to the discovery of new, and the improvement of known, piezoelectric ceramics. This effort produced what is probably the best known of all piezoelectric ceramics, with the possible exception of barium titanate, namely lead zirconate-titanate.

Like barium titanate, lead zirconate-titanate is characterized by a perovskite-type crystal structure and has the type formula $ABO_3$. However, it differs in that it is not a single compound: it is composed of lead zirconate and lead titanate, or their component oxides, effectively in solid solution. The solid solution system is characterized by a substantially morphotropic[1] phase boundary which occurs at about the 53 mol percent lead zirconate point and separates a rhombohedral phase on the high lead zirconate side of the phase boundary from a tetragonal phase on the high lead titanate side.

While both the rhombohedral and tetragonal phases are ferroelectric, optimum piezoelectric properties occur in compositions in proportion to their proximity to the phase boundary although for special purposes requiring unique properties or combination of properties, compositions remote from the phase boundary may be preferred as explained in copending application of F. Kulcsar and W. Cook, Serial No. 164,076 filed January 3, 1962, now Patent No. 3,179,594, and assigned to the same assignee as the present invention.

For additional information concerning the properties and preparation of lead zirconate-titanate, reference may be had to U.S. Letters Patent No. 2,708,244 issued to Bernard Jaffe.

[1] A phase boundary determined substantially by composition and not temperature.

Similar to lead zirconate-titanate in structure and properties are piezoelectric ceramic materials from the binary system lead stannate-lead titanate and the ternary system lead zirconate-lead titanate-lead stannate. Within certain ranges hereinafter set forth, members of these systems also display marked ferroelectric properties rendering them useful for the purposes of this invention and in the same general field of application as lead zirconate-titanate.

For additional information concerning lead zirconate-lead titanate-lead stannate and lead stannate-lead titanate systems, and specific compositions thereof, reference may be had to United States Letters Patent No. 2,849,404 to B. Jaffe et al.

As used herein, the term lead zirconate-titanate will be understood to mean compositions having mol ratios which yield polarizable ceramic material exhibiting useful piezoelectric properties and to include compositions wherein lead stannate wholly or partially replaces lead zirconate.

With allusion to the type formula $ABO_3$, lead and its substituents may be referred to as occupying the "A" positions and zirconium, titanium, tin, and substituents therefore as occupying the "B" position.

Despite the high electromechanical coupling of lead zirconate-titanate ceramics and the manifold advantages which it has in common with barium titanate and other piezoelectric ceramics over single crystal piezoelectric, certain properties and certain combinations of properties of lead zirconate-titanate leave considerable room for improvement and have over the years been extensively improved by chemical modification. Thus, the substitution of strontium and/or calcium for lead greatly increases the relative dielectric constant of the material and achieves a modest improvement in mechanical Q as described and claimed in U.S. Letters Patent 2,906,710 to F. Kulcsar and C. Cmolik.

A further modification of lead zirconate-titanate described and claimed in U.S. Letters Patent No. 2,911,370 to F. Kulcsar, involves additions of niobium, tantalum, and/or various rare earth elements and produces material combining high dielectric constant with high planar coupling, increased resistivity, and improved aging characteristics as compared to unmodified lead zirconate-titanate. It is particularly to the achievement of the same general type of materials as disclosed in U.S. Letters Patent No. 2,911,370 that the present invention addresses itself. To this end, the invention contemplates piezoelectric ceramic materials which may be considered as derived from basic lead zirconate-titanate compositions by the inclusion therein of small quantities of thorium and/or tungsten, alone or in combination with other modifying agents.

The fundamental object of the present invention is to provide novel and improved piezoelectric ceramic materials characterized by high relative permittivity and piezoelectric response, individually, and in combination.

A further object of the invention is the provision of improved electromechanical transducers utilizing, as the active elements, an electrostatically polarized body of the novel ceramic compositions alluded to above and hereinafter described and claimed.

These and other objects of the invention, its advantages, scope and the manner in which it may be practiced will be more readily apparent to persons conversant with the art from the following description and specific exemplary embodiments thereof taken in conjunction with the subjoined claims and the annexed drawing in which:

Figures 1, 2, 3:
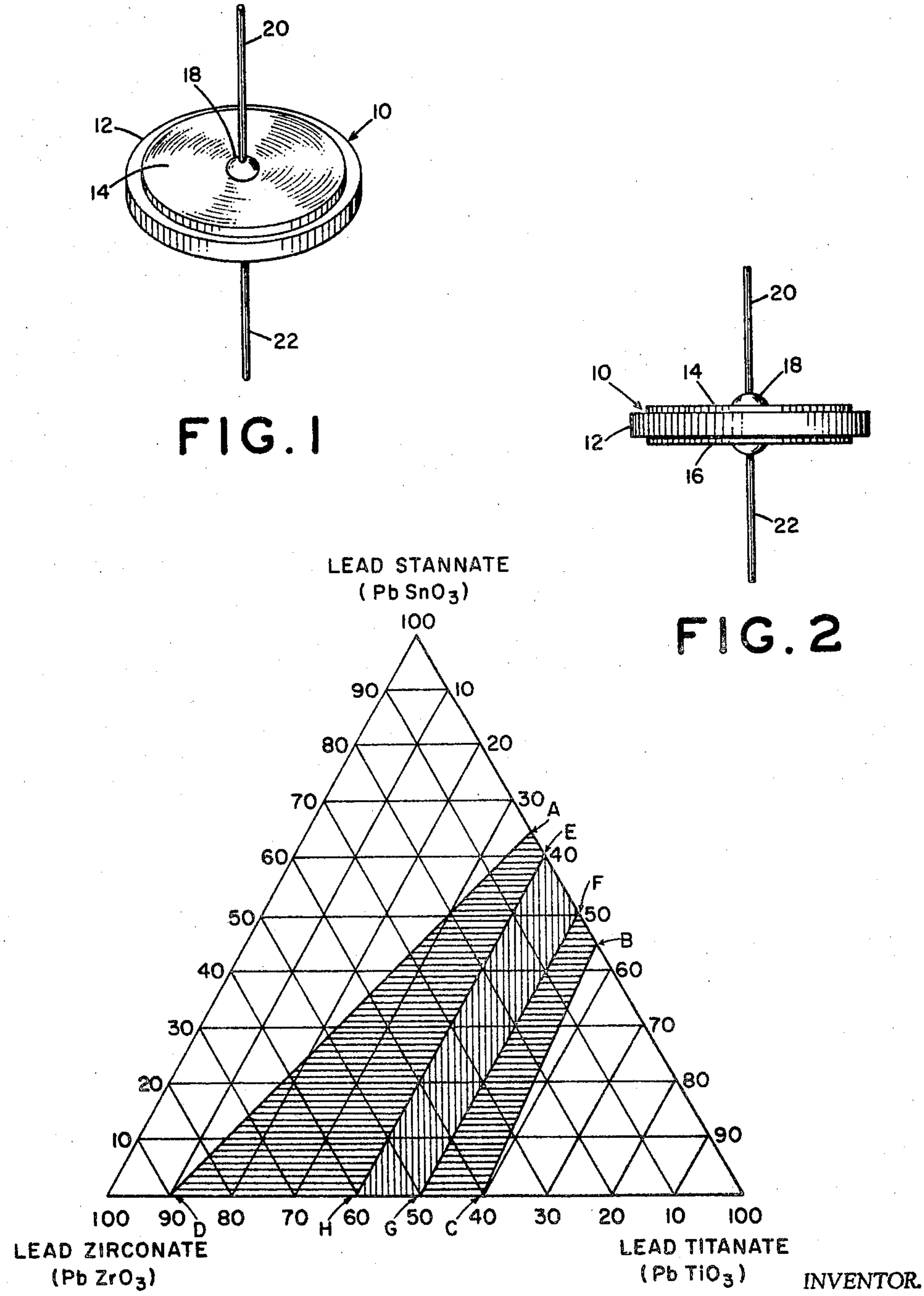
FIGURE 1 is a perspective elevational view of an electromechanical transducer embodying the present invention.
FIGURE 2 is a side elevational view of the transducer shown in FIGURE 1.
FIGURE 3 is a triangular compositional diagram of materials utilized in the present invention.

Before proceeding with a detailed description of the piezoelectric ceramic materials contemplated by the invention, their application in electromechanical transducers will be described with reference to FIGURES 1 and 2 of the drawings wherein 10 designates, as a whole, an electromechanical transducer having, as its active element, a preferably disk-shaped body 12 of a piezoelectric ceramic material according to the present invention. Body 12 is electrostatically polarized, in the manner hereinafter set forth, and provided with a pair of electrodes 14 and 16 applied in a suitable manner on two opposed surfaces thereof. Conductively attached to the electrodes 14 and 16, as by solder 18, are respective lead wires 20 and 22 operative to connect the transducer in the electrical or electronic circuit, not shown, in which it is to be employed.

As is well known in the art an electromechanical transducer operates to convert applied electrical energy to mechanical energy and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes piezoelectric filters, frequency control devices, and the like, and that the invention may also be used and adapted to various other applications requiring materials having dielectric, piezoelectric and/or electrostrictive properties.

For the sake of clarity and ease of description, the constituents of compositions according to the invention may be categorized as "principal" and "secondary," the former term being applied to those which make up a major fraction of the whole composition and the latter to those which make up a minor fraction. The principal ingredient in all cases is lead zirconate-titanate with lead stannate optionally replacing all or part of the lead zirconate. At this juncture it is pointed out that there is some uncertainty and conflict of opinion as to the stability and separate existence of lead stannate as such; therefore, it is to be understood that lead stannate, as referred to herein, may be considered as a combination of lead oxide (PbO) and tin oxide ($SnO_2$) in stoichiometric proportions (a mol ratio 1:1) corresponding to the empirical formula $PbSnO_3$.

Furthermore, as will be appreciated by those conversant with the art, hafnium occurs as an impurity in varying amounts in zirconium; for the purposes of the present invention, hafnium may be regarded as a substantial equivalent of zirconium: the presence of hafnium either as an impurity or as a substituent for zirconium is acceptable. However, because the high relative cost of hafnium as compared to zirconium renders its use uneconomic in the commercial manufacture of the compositions under discussion, the present description will disregard the possible presence of hafnium.

Referring now to FIGURE 3 of the drawings, all basic compositions coming within all three of the systems defined above are represented by the triaxial diagram. All compositions included within the diagram as a whole, however, are not ferroelectric and many are electromechanically active only to a very slight degree. The basic compositions utilized in the present invention are those exhibiting piezoelectric response of appreciable magnitude. As a matter of convenience, the planar coupling ($k_p$) of polarized disks of the piezoelectric material will be taken as a measure of piezoelectric activity. Thus, within the horizontally etched area bounded by lines connecting points ABCD, all basic compositions polarized and tested showed a radial coupling coefficient of at least 0.10. The area bounded by ABCD includes binary lead zirconate-lead titanate solid solutions lying on the line DC along which the mol ratio ($PbZrO_3$:$PbTiO_3$) of the end components varies from 90:10 to 40:60. Among these base line compositions those falling between points H and G have characteristically higher radial couplings with the highest couplings occurring in the immediate vicinity of the morphotropic phase boundary as already explained.

The binary basic compositions on line AB ($PbSnO_3$:$PbTiO_3$ from 65:35 to 45:55) of the FIGURE 3 diagram are similar to those on line DC in structure but are characterized by generally lower radial couplings with the best couplings occurring in compositions falling between points E and F, i.e., with a mol ratio $PbSnO_3$:$PbTiO_3$ in the range 60:40 to 50:50.

In the ternary basic compositions within the area designated ABCD, the inclusion of $PbSnO_3$ as a substituent for a portion of the $PbZrO_3$ in the base line compositions has the effect of progressively lowering the Curie temperature but the compositions retain in a relatively high planar coupling, particularly in the area of the diagram bounded by lines connecting points EFGH, again due to proximity to the morphotropic phase boundary.

The present invention is based on the discovery that piezoelectric ceramic materials of the same general type and having substantially the same properties as those disclosed in the aforementioned U.S. Letters Patent No. 2,911,370, viz, higher electromechanical coupling and higher relative permittivity, than unmodified lead zirconate-titanate, can be achieved by the inclusion of thorium and/or tungsten, alone or in combination with other modifiers in the basic compositions consisting essentially of lead zirconate-titanate.

The thorium is believed to enter the atomic lattice in the "A" position, substituting for lead in the basic compositions. Accordingly, the lead in the basic composition is diminished by an amount equivalent, on an atom basis, to the added thorium such that one atom of thorium replaces two atoms of lead. The range of thorium-for-lead substitution is from 0.1 to 8 atom percent with 1 to 4 atom percent preferred as this yields the greatest improvement in the dielectric constant, K, and/or planar coupling, $k_p$, compared to unmodified lead zirconate-titanate.

The tungsten is believed to enter the lattice in the "B" position and was added as a weight percent addition balanced with an equimolar quantity of lead oxide. Specifically, the qauntity of added tungsten is equivalent to from 0.1 to 5 weight percent $WO_3$ balanced with equimolar quantities of PbO, i.e., in stoichiometric proportions of $PbWO_4$.

The general effects of the thorium and tungsten are essentially the same, quantitatively and qualitatively: both produce market increases in dielectric constant and planar coupling, as compared to unmodified lead zirconate-titanate. In this respect, thorium and tungsten resemble modifying additions of niobium, tantalum and rare earth elements as described in the aforementioned U.S. Letters Patent No. 2,911,370 and the bismuth addition described in the concurrently filed application Serial No. 225,320 of F. Kulcsar entitled Ferroelectric Ceramic Compositions and assigned to the same assignee as the present invention.

In application Serial No. 225,320 it is explained that the elements described in U.S. Letters Patent No. 2,911,370 have in common the fact that their ionic radii are similar to the element which they evidently replace in the crystal lattice but have a valence state differing by one unit from the ion replaced. Thus, at the "A" site, bismuth, lanthanum, and the other rare earth elements having a valence of 3+, have one more unit of valence than the lead ions (2+) for which they are substituted; the other modifiers, niobum and tantalum, described in U.S. Letters Patent No. 2,911,370 have ions similar in size to those in the "B" position of the basic compositions for which they are substituted and also have one more unit of valence, i.e., 5+ as against 4+.

The thorium and tungsten, however, differ from the additives set forth in Patent No. 2,911,370 in that they have a valence greater by two units than the elements replaced. Thus, quadrivalent thorium replaces bivalent lead in the "A" position and hexavalent tungsten replaces quadrivalent elements (Zr, Ti, Sn) in the "B" position.

While the thorium and/or tungsten additions yield highly useful improvement, even better results are achieved when used with basic compositions of the type disclosed and claimed in U.S. Letters Patent No. 2,906,710 and copending application Serial No. 151,841 filed November 13, 1961, by B. Jaffe and F. Kulcsar and assigned to the same assignee as the present invention. This will be evident from a review of the tabulation of data on a variety of compositions presented hereinbelow as well as that in U.S. Patent No. 2,906,710.

Where thorium is used in conjunction with other substituents for lead, e.g., lanthanum, bismuth, etc., the total quantity of lead replaced should not appreciably exceed 25 atom percent.

The compositions proposed may be prepared in accordance with various ceramic procedures, which, in themselves are well-known in the art. The specific exemplary compositions tabulated hereinbelow were prepared in substantially the following manner: lead oxide (PbO), zirconia ($ZrO_2$) and titania ($TiO_2$), all of relatively pure grade were combined in substantially stoichiometric proportions corresponding to the basic composition and particular mol ratio desired; the lead oxide was diminished from the stoichiometric proportion by an amount equivalent on an atom basis, to the thorium added. Thorium was added in the form of oxalate, $Th(C_2O_4)_2 \cdot 2H_2O$, as this proved much easier to react completely.

Tungsten was added in the form of trioxide ($WO_3$), strontium in the form of strontium carbonate and lanthanum as lanthanum oxide. It will be appreciated that in place of the oxides, suitable compounds thermally reactable to yield the same perovskite solid solution can be employed. Moreover, while yellow lead oxide (PbO) was employed it will be appreciated that red lead oxide or any other lead oxide may be utilized if preferred as these decompose in the heat reaction and/or firing of the compositions to yield PbO.

The combined ingredients were wet milled to achieve thorough mixing and particle size reduction. While care was taken to avoid contamination of the mixture during milling, as well as to avoid changes in composition due to contamination and/or volatilization during reaction and firing, it will be understood that the proportions stated in this description and the subjoined claims are those desired and intended, exclusive of impurities in the raw materials, and not necessarily that of the final product.

After milling, the mixture was reacted by heating at a temperature of around 850° C. for approximately two hours. To control loss of lead through volatilization at the reaction temperature, the reaction was carried out in a suitable enclosure.

After reaction, the material was allowed to cool and then crushed and milled to a small and relatively uniform particle size. The milled powder was then mixed with a bonding and lubricating agent consisting of equal parts by volume of water and Mobilcer C. Mobilcer C is a commercially available product consisting of an aqueous dispersion (41–46 percent solids) of paraffin (M.P. 122° F.). The mix was then pressed into disks roughly one inch in diameter and two to three millimeters thick. These were fired to maturity at a temperature of around 1300° C. for about 45 minutes in an enclosure containing a source of lead oxide vapor to control lead loss.

The fired disks were then polarized in a manner well known in the art: electrodes (e.g., 14, 16, FIGURES 1 and 2) were applied to opposite faces of the disks and a high electrostatic field applied. While the particular conditions of polarization may be varied as desired, the specimens for which data are given hereinbelow were polarized with D.C. field strengths ranging from 75 to 100 volts per mil at a temperature of about 105° C. For additional details as to this and various other methods of polarizing piezoelectric ceramic materials, reference may be had to U.S. Letters Patent No. 2,928,163.

Examples of specific ceramic compositions according to this invention and various pertinent electrical and electromechanical properties thereof are given in the following tabulation in which the various constant and coefficients are defined as follows:

K: relative dielectric constant; permittivity of the material relative to permittivity of space, measured at one kc.

$k_p$: planar piezoelectric coupling coefficient

D (percent): dielectric loss or power factor measured at one kc.

TABLE I

| Example Number | Basic Composition | K | Percent D | $k_p$ |
|---|---|---|---|---|
| 0 | $Pb(Zr_{.53}Ti_{.47})O_3$ | 475–600 | 0.39–1.26 | 0.45–0.50 |
| 1 | $Pb_{.992}Th_{.004}(Zr_{.52}Ti_{.48})O_3$ | 1,230 | 1.5 | .45 |
| 2 | $Pb_{.990}Th_{.005}(Zr_{.52}Ti_{.48})O_3$ | 1,415 | 1.5 | .52 |
| 3 | $Pb_{.988}Th_{.006}(Zr_{.52}Ti_{.48})O_3$ | 1,560 | 1.5 | .56 |
| 4 | $Pb_{.970}Th_{.015}(Zr_{.52}Ti_{.48})O_3$ | 1,292 | 1.5 | .50 |
| 5 | $Pb_{.960}Th_{.020}(Zr_{.52}Ti_{.48})O_3$ | 1,000 | 1.3 | .46 |
| 6 | $Pb_{.990}Th_{.005}(Zr_{.50}Ti_{.50})O_3$ | 1,045 | 1.6 | .40 |
| 2[1] | $Pb_{.990}Th_{.005}(Zr_{.52}Ti_{.48})O_3$ | 1,415 | 1.5 | .52 |
| 7 | $Pb_{.990}Th_{.005}(Zr_{.53}Ti_{.47})O_3$ | 1,406 | 1.8 | .52 |
| 8 | $Pb_{.99}Th_{.01}[(Zr_{.52}Ti_{.48})_{.99}Ni_{.01}]O_3$ | 1,325 | 0.9 | .45 |
| 9 | $Pb_{.98}Th_{.02}[(Zr_{.52}Ti_{.48})_{.98}Ni_{.02}]O_3$ | 1,380 | 0.8 | .42 |
| 10 | $Pb_{.985}Th_{.015}[(Zr_{.53}Ti_{.47})_{.985}Ni_{.015}]O_3$ | 1,490 | 1.1 | .50 |
| 11 | $Pb_{.980}Th_{.020}[(Zr_{.53}Ti_{.47})_{.980}Ni_{.02}]O_3$ | 1,685 | 0.8 | .50 |
| 12 | $Pb_{.975}Th_{.025}[(Zr_{.53}Ti_{.47})_{.975}Ni_{.025}]O_3$ | 1,675 | 1.2 | .47 |
| 13 | $Pb_{.960}Th_{.040}[(Zr_{.53}Ti_{.47})_{.960}Ni_{.04}]O_3$ | 1,820 | 1.2 | .44 |
| 14 | $Pb_{.940}Sr_{.05}Th_{.005}(Zr_{.53}Ti_{.47})O_3$ | 1,721 | 1.7 | .56 |
| 15 | $Pb_{.940}Sr_{.05}Th_{.005}(Zr_{.52}Ti_{.48})O_3$ | 1,480 | 1.7 | .51 |
| 16 | $Pb_{.960}Bi_{.02}Th_{.005}(Zr_{.52}Ti_{.48})O_3$ | 1,448 | 1.8 | .55 |

[1] Repeated to facilitate comparison.

TABLE II

| Example Number | Basic Composition | Wt. Percent Additions | | K | Percent D | $k_p$ |
|---|---|---|---|---|---|---|
| | | W as $WO_3$ [1] | U as $UO_3$ [2] | | | |
| 0 | $Pb(Zr_{.53}Ti_{.47})O_3$ | 0 | 0 | 475–600 | 0.39–1.26 | 0.45–0.50 |
| 21 | $Pb(Zr_{.53}Ti_{.47})O_3$ | 0.5 | 0 | 1,070 | 2.2 | .57 |
| 22 | $Pb(Zr_{.53}Ti_{.47})O_3$ | 1.0 | 0 | 1,362 | 2.0 | .59 |
| 23 | $Pb(Zr_{.52}Ti_{.48})O_3$ | 1.0 | 0 | 1,600 | 1.1 | .59 |
| 24 | $Pb_{.80}Ba_{.20}(Zr_{.52}Ti_{.48})O_3$ | 1.0 | 0 | 2,580 | 1.9 | .49 |
| 25 | $Pb_{.80}Ba_{.20}(Zr_{.53}Ti_{.47})O_3$ | 1.0 | 0 | 3,310 | 2.5 | .54 |
| 26 | $Pb_{.80}Ba_{.20}(Zr_{.54}Ti_{.46})O_3$ | 1.0 | 0 | 3,190 | 3.0 | .54 |
| 27 | $Pb_{.80}Ba_{.20}(Zr_{.53}Ti_{.47})O_3$ | 1.0 | 0.75 | 2,210 | 2.1 | .54 |
| 28 | $Pb_{.80}Ba_{.20}(Zr_{.53}Ti_{.47})O_3$ | 1.0 | 1.00 | 2,200 | 3.0 | .54 |

[1] Balanced with equimolar addition of PbO.
[2] Balanced with addition of lead oxide in stoichiometric proportion corresponding to $Pb_3U_4O_{15}$.

TABLE III

| Ex. No. | Basic Composition | K | Percent D | $K_p$ |
|---|---|---|---|---|
| 17 | $Pb_{.944}Th_{.003}(Zr_{.52}Ti_{.48})O_3$+0.5 wt. percent $WO_3$ and equimolar PbO. | 1,640 | 1.4 | .55 |
| 18 | $Pb_{.988}Th_{.006}(Zr_{.52}Ti_{.48})O_3$+0.5 wt. percent $WO_3$ and equimolar PbO. | 1,560 | 1.5 | .55 |
| 19 | $Pb_{.988}Th_{.006}(Zr_{.52}Ti_{.48})O_3$+1.0 wt. percent $WO_3$ and equimolar PbO. | 1,440 | 1.6 | .48 |
| 20 | $Pb_{.966}La_{.01}Th_{.006}[(Zr_{.52}Ti_{.48})_{.985}Nb_{0.015}]O_3$ +1.0 wt. percent $WO_3$ and equimolar PbO. | 1,405 | 1.4 | .49 |

Referring now to the tables of exemplary compositions, it will be noted that Example No. 0 is unmodified lead zirconate-titanate, a conventional composition included in the table to serve as a basis for comparison; the particular mol ratio was selected because it falls near the aforementioned morphotropic phase boundary so that the composition exhibits near-optimum combinations of electromechanical coupling coefficient and dielectric constant.

It will be evident from the data present for the tabulated compositions that the addition of thorium or tungsten to the basic compositions has the general effect of raising the dielectric constant. The amount of the increase ranges from about 70 percent for small additions of tungsten (Table II, Example 21) to over 500 percent (Table II, Example 25) when an addition of one weight percent $WO_3$ is combined with barium as a partial substituent for lead.

The effect of thorium is generally similar although not quite so pronounced. At the 52:48 mol ratio, the optimum effect is achieved with 0.6 atom percent thorium as will be seen from Table I, Examples 1 to 5.

Inasmuch as the presence of additives in lead zirconate-titanate have the effect of shifting the morphotropic phase boundary which occurs, in the unmodified compositions, at approximately 53 mol percent lead zirconate, for optimum properties the mol ratio should be adjusted to compensate for shifts in the phase boundary caused by the modifiers.

Referring to Example Nos. 2, 6 and 7 (Table I) all of which contain an 0.5 atom percent substitution of thorium for lead, it will be noted that the phase boundary and concomitantly peak dielectric constants and planar coupling coefficients occur in the vicinity of zirconate:titanate mol ratios 52:48 to 53:47. With larger percentages of the lead replaced and a one weight percent addition of $WO_3$ the phase boundary shifts so that peak dielectric constants and electromechanical coupling coefficients are obtained in the vicinity of the mol ratios 53:47 to 54:46 as will be seen from Examples Nos. 24, 25 and 26 (Table II).

For additional information regarding phase boundary shifts, reference may be had to the aforementioned concurrently-filed application Serial No. 225,320.

It should be understood that while the highest dielectric constant and planar coupling coefficient is desirable in most applications of piezoelectric ceramics and, therefore, compositions in the vicinity of the phase boundary would be preferred, compositions somewhat remote from the phase boundary are by no means lacking in utility and, in some cases, possess advantages in regard to particular fields of application which more than outweigh the sacrifice of peak dielectric constants and coupling coefficients as fully explained in the aforementioned application Serial No. 164,076.

The various other compositions included in Tables I, II and III are intended to show the compatibility with and effect of thorium and tungsten combined with each other (Table III) and with other modifying agents. Thus, Examples 9–13 demonstrate the combination of thorium with additives of the type described in copending application of J. A. Sugden, Serial No. 839,756 filed September 14, 1959 and now U.S. Patent No. 3,068,177; Examples 14 and 15 show combinations of thorium with a modification of lead zirconate-titanate according to U.S. Letters Patent 2,906,710; Example 16, a combination of thorium with a bismuth modification as described in the aforementioned concurrently-filed application Serial No. 225,320; Example 20, a combination of both thorium and tungsten with modifications according to U.S. Letters Patent No. 2,911,370; Examples 24–28, the combination of tungsten with a barium substitution for lead in accordance with the aforementioned copending application Serial No. 164, 076; and Examples 27 and 28 the combination of tungsten with an addition (viz, uranium) as described in U.S. Letters Patent No. 3,006,857.

In addition to the advantageous properties outlined above, compositions according to the present invention yield ceramics of good physical quality and which polarize well.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A polarizable ferroelectric ceramic composition consisting essentially of a material selected from the area ABCD of FIGURE 3 modified by the addition of at least one element from the group consisting of thorium and tungsten, thorium in an amount of from 0.1 to 8 atom percent being selectively added as a substituent for part of the lead and tungsten being selectively added in a quantity equivalent to from 0.1 to 5.0 weight percent $WO_3$.

2. A ferroelectric ceramic composition as claimed in claim 1 wherein at least one element selected from the group consisting of barium, calcium and strontium is substituted for amounts of lead, the amount of lead replaced being not more than 25 atom percent.

3. A polarizable ferroelectric ceramic composition as claimed in claim 1 which contains at least one element selected from the group consisting of niobium, tantalum, yttrium and the rare earth elements except cerium, in a total quantity equivalent to from 0.1 to 5 weight percent of the respective oxides.

4. A ferroelectric ceramic composition as claimed in claim 3 wherein at least one element selected from the group consisting of barium, calcium and strontium is substituted for amounts of lead, the amount of lead replaced being not more than 25 atom percent.

5. A polarizable ferroelectric ceramic composition consisting essentially of the basic combination of lead, titanium and zirconium in oxide form in substantially stoichiometric proportions corresponding to lead zirconate and lead titanate in zirconate-titanate mol ratios ranging from 90:10 to 40:60, said combination being modified by the substitution of from about 0.1 to 8 atom percent thorium for lead in said composition.

6. A polarizable ferroelectric ceramic composition consisting essentially of the basic combination of lead, titanium and zirconium in oxide form in substantially stoichiometric proportions corresponding to lead zirconate and lead titanate in zirconate-titanate mol ratios ranging from 90:10 to 40:60, said combination being modified by the replacement of from about 1 to 25 atom percent of said lead with from 0.1 to 8 atom percent of thorium, the balance of said 25 atom percent being selected from the group consisting of strontium, calcium and barium.

7. A ferroelectric ceramic composition consisting essentially of lead, zirconium and titanium in oxide form combined in substantially stoichiometric proportions corresponding to lead zirconate and lead titanate in a zirconate-to-titanate mol ratio of from 52:48 to 53:47, from 1 to 4 atom percent of the lead being replaced with thorium.

8. A ferroelectric ceramic composition consisting essentially of the constituency indicated by the formula:

$$Pb_{.988}Th_{.006}(Zr_{.52}Ti_{.48})O_3$$

9. A ferroelectric ceramic composition consisting essentially of the constituency indicated by the formula:

$$Pb_{.994}Th_{.003}(Zr_{.52}Ti_{.48})O_3$$

and containing 0.5 weight percent $WO_3$ and an equimolar quantity of PbO.

10. A ferroelectric ceramic composition consisting essentially of the constituency indicated by the formula:

$$Pb_{.94}Sr_{.05}Th_{.005}(Zr_{.63}Ti_{.47})O_3$$

11. A polarizable ferroelectric ceramic composition consisting essentially of the basic combination of lead, titanium and zirconium in oxide form in substantially stoichiometric proportions corresponding to lead zirconate and lead titanate in zirconate-titanate mol ratios ranging from 90:10 to 40:60, said combination being modified by the adition of tungsten to said combination in a quantity equivalent to from 0.1 to 5 weight percent $WO_3$.

12. The composition according to claim 11 wherein 1 to 25 atom percent of the lead in said basic combination is replaced with at least one element from the group consisting of barium, strontium and calcium.

13. A polarizable ferroelectric ceramic composition as claimed in claim 11 which contains at least one element selected from the group consisting of niobium, tantalum, yttrium and the rare earth elements except cerium, in a total quantity equivalent to from 0.1 to 5.0 weight percent of the respective oxides.

14. A ferroelectrric ceramic composition as claimed in claim 13 wherein at least one element selected from the group consisting of barium, calcium and strontium is substituted for amounts of lead, the amount of lead replaced being not more than 25 atom percent.

15. A polarizable ferroelectric ceramic composition consisting essentially of lead, zirconate and titanate in oxide form combined in substantially stoichiometric proportions corresponding to lead zirconate lead titanate in a zirconate to titanate mol ratio of from 52:48 to 53:47 and modified by the addition of tungsten in a quantity equivalent to from 0.1 to 5.0 weight percent $WO_3$.

16. A ferroelectric ceramic composition as claimed in claim 15 wherein at least one element selected from the group consisting of barium, calcium and strontium is substituted for amounts of lead, the amount of lead replaced being not more than 25 atom percent.

17. A polarizable ferroelectric ceramic composition as claimed in claim 15 which contains at least one element selected from the group consisting of niobium, tantalum, yttrium and the rare earth elements except cerium, in a total quantity equivalent to from 0.1 to 5.0 weight percent of the respective oxides.

18. A ferroelectric ceramic composition as claimed in claim 17 wherein at least one element selected from the group consisting of barium, calcium and strontium is substituted for amounts of lead, the amount of lead replaced being not more than 25 atom percent.

19. A ferroelectric ceramic composition consisting essentially of the constituency indicated by the formula:

$$Pb_{.80}Ba_{.20}(Zr_{.53}Ti_{.47})O_3$$

and containing 1.0 weight percent $WO_3$ and an equimolar quantity of PbO.

20. A ferroelectric ceramic composition consisting essentially of the constituency indicated by the formula:

$$Pb(Zr_{.52}Ti_{.48})O_3$$

and containing 1.0 weight percent $WO_3$ and an equimolar equivalent of PbO.

References Cited by the Examiner

UNITED STATES PATENTS 2,911,370 11/1959 Kulcsar ---------- 252—62.9

OTHER REFERENCES

Berlincourt, Piezoelectric Ceramic Materials, April 27, 1959, Project No. 30,146, Clevite Research Center, Cleveland, Ohio, pp. 73–85.

TOBIAS E. LEVOW, *Primary Examiner.*

MAURICE A. BRINDISI, *Examiner.*

S. R. BRESCH, R. D. EDMONDS, *Assistant Examiners.*

UNITED STATES PATENT OFFICE
CERTIFICATE OF CORRECTION

Patent No. 3,264,217 August 2, 1966

Frank Kulcsar

It is hereby certified that error appears in the above numbered patent requiring correction and that the said Letters Patent should read as corrected below.

Column 1, line 22, for "mixture" read -- mixtures --; column 4, line 17, strike out "$(PbSnO_3:PbTiO_3$"; line 16, after "AB" insert -- $(PbSnO_3:PbTiO_3$ --; column 5, line 7, for "niobum" read -- niobium --; line 19, for "improvement" read -- improvements --; column 7, in TABLE III, second column, line 1 thereof, for "$Pb_{.944}$" read -- $Pb_{.994}$ --; column 9, line 55, for "$(Zr_{.63}$" read -- $(Zr_{.53}$ --; line 63, for "adition" read -- addition --.

Signed and sealed this 26th day of September 1967.

(SEAL)
Attest:

ERNEST W. SWIDER
Attesting Officer

EDWARD J. BRENNER
Commissioner of Patents

Disclaimer 3,264,217.—*Frank Kulcsar*, Cleveland, Ohio. FERROELECTRIC CERAMIC COMPOSITIONS. Patent dated Aug. 2, 1966. Disclaimers filed Feb. 27, 1968 and Mar. 7, 1968, by the assignee, *Clevite Corporation.*

Hereby enters these disclaimers to claims 11, 12, 15, 16 and 20 of said patent.

[*Official Gazette May 14, 1968.*]

UNITED STATES PATENT OFFICE

CERTIFICATE OF CORRECTION

Patent No. 3,264,217 August 2, 1966

Frank Kulcsar

It is hereby certified that error appears in the above numbered patent requiring correction and that the said Letters Patent should read as corrected below.

Column 1, line 22, for "mixture" read -- mixtures --; column 4, line 17, strike out "($PbSnO_3$:$PbTiO_3$"; line 16, after "AB" insert -- ($PbSnO_3$:$PbTiO_3$ --; column 5, line 7, for "niobum" read -- niobium --; line 19, for "improvement" read -- improvements --; column 7, in TABLE III, second column, line 1 thereof, for "$Pb_{.944}$" read -- $Pb_{.994}$ --; column 9, line 55, for "($Zr_{.63}$" read -- ($Zr_{.53}$ --; line 63, for "adition" read -- addition --.

Signed and sealed this 26th day of September 1967.

(SEAL)
Attest:

ERNEST W. SWIDER
Attesting Officer

EDWARD J. BRENNER
Commissioner of Patents